(12) United States Patent
Li (10) Patent No.: US 11,705,655 B2
(45) Date of Patent: Jul. 18, 2023

(54) ELASTIC CONTACT ELEMENT OF AN ELECTRICAL CONNECTOR

(71) Applicant: T-CONN PRECISION CORPORATION, New Taipei (TW)

(72) Inventor: Ju-Ping Li, New Taipei (TW)

(73) Assignee: T-CONN PRECISION CORPORATION, New Taipei (TW)

( * ) Notice: Subject to any disclaimer, the term of this patent is extended or adjusted under 35 U.S.C. 154(b) by 81 days.

(21) Appl. No.: 17/474,388

(22) Filed: Sep. 14, 2021

(65) Prior Publication Data

US 2023/0035246 A1 Feb. 2, 2023

(30) Foreign Application Priority Data

Jul. 30, 2021 (TW) .................................. 110128228

(51) Int. Cl.
*H01R 13/187* (2006.01)
*H01R 13/11* (2006.01)

(52) U.S. Cl.
CPC ........ *H01R 13/111* (2013.01); *H01R 2201/26* (2013.01)

(58) Field of Classification Search
CPC ............................ H01R 13/187; H01R 13/111
See application file for complete search history.

(56) References Cited

U.S. PATENT DOCUMENTS

| 4,550,972 | A  | * | 11/1985 | Romak   | H01R 13/111 |
|-----------|----|---|---------|---------|-------------|
|           |    |   |         |         | 439/843     |
| 5,667,413 | A  | * | 9/1997  | Trafton | H01R 13/187 |
|           |    |   |         |         | 439/271     |
| 10,135,167| B2 | * | 11/2018 | Wollitzer | H01R 13/187 |
| 10,135,231| B2 |   | 11/2018 | Maziere et al. | |
| 10,535,943| B2 | * | 1/2020  | Szymura | H01R 13/187 |
| 10,879,656| B2 | * | 12/2020 | Wang    | H01R 13/66  |
| 11,462,848| B2 | * | 10/2022 | Listing | H01R 13/187 |
| 2014/0357137| A1| * | 12/2014 | Sian  | H01R 13/187 |
|           |    |   |         |         | 439/843     |

FOREIGN PATENT DOCUMENTS

CN    208674445 U    3/2019

* cited by examiner

*Primary Examiner* — Neil Abrams
(74) *Attorney, Agent, or Firm* — Birch, Stewart, Kolasch & Birch, LLP (57) ABSTRACT

An elastic contact element of the electrical connector is provided and has an upper ring, a lower ring, and a plurality of elastic flat bodies connected to and located between the upper ring and the lower ring. Each one of the elastic flat bodies is strip-shaped and forms a contact portion. The elastic flat bodies are spaced apart from each other and divided into several groups according to different height positions of the contact portions. Each one of the contact portions protrudes toward a center axis. Because the elastic flat bodies are divided into several groups according to different height positions of the contact portions, the elastic flat bodies contact an inserted male probe at various positions.

6 Claims, 9 Drawing Sheets

FIG. 9
PRIOR ART

ELASTIC CONTACT ELEMENT OF AN ELECTRICAL CONNECTOR

BACKGROUND OF THE INVENTION

1. Field of the Invention

The present invention relates to an elastic contact element, especially to an elastic contact element that is configured to be mounted on an electrical connector and thereby is capable of electrically connecting to a male probe.

2. Description of the Prior Arts

Urged by environmental protection and alternative energy issues, electric vehicles have become one of the most popular industries in recent years. Because electric vehicles rely on charging to restore endurance, in order to improve charging efficiency, an electric vehicle and a charging pile must be properly connected by an interconnecting device which allows high current to flow through.

Figure 6:
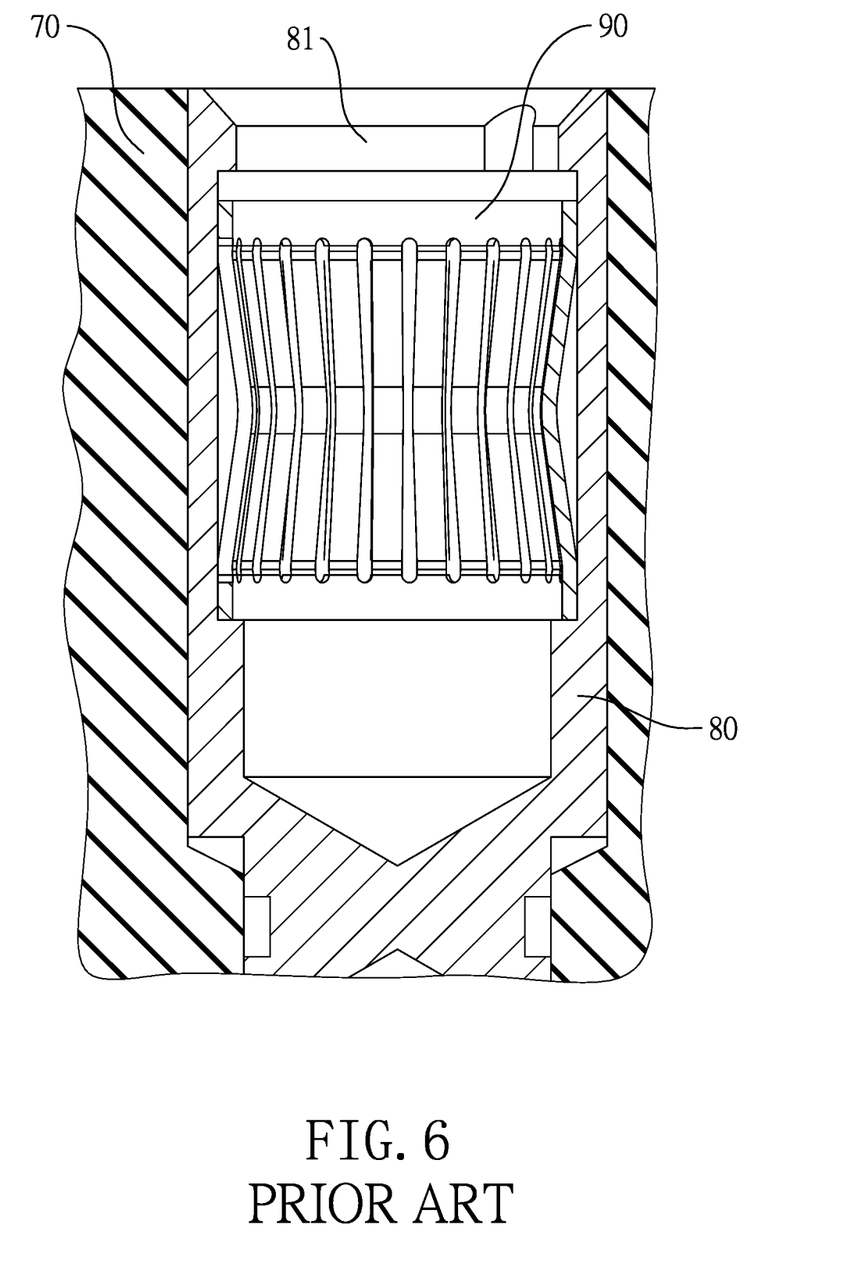
FIG. 6 is a sectional view of a portion of a conventional electrical connector.

As shown in FIG. 6, a conventional charging connector is provided. The charging connector mainly comprises at least one electrical terminal 80 mounted on a base 70. An end of the electrical terminal 80 is hollow and thus forms a jackhole 81. The jackhole 81 is configured as a male probe (not shown in the figure) of a corresponding connector. To ensure the electrical connection between the electrical terminal 80 and the inserted male probe is stable, the electrical terminal 80 comprises an elastic contact element 90 in the jackhole 81.

Figure 7:
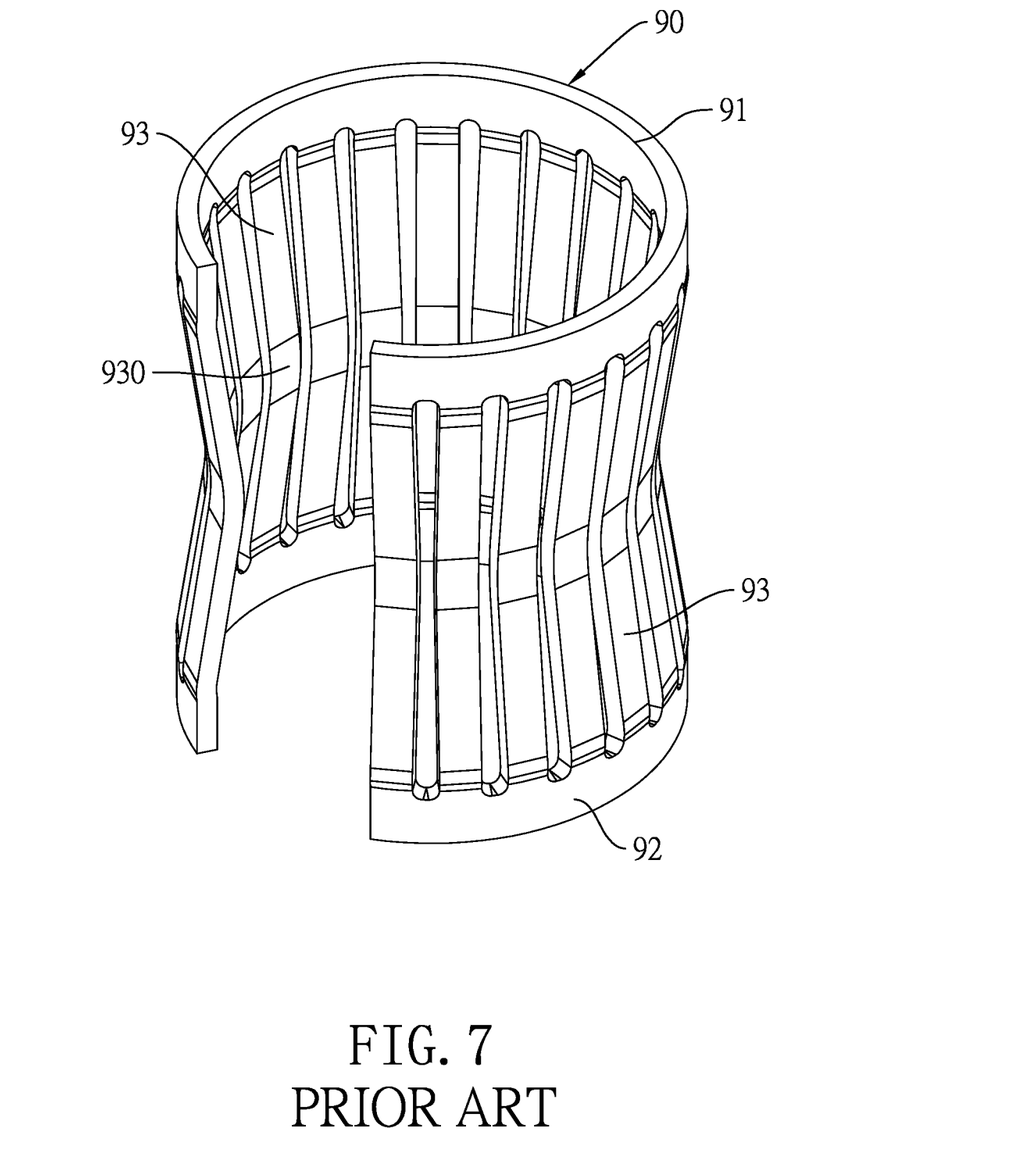
FIG. 7 is a perspective view of a conventional elastic contact element.
Figure 8:
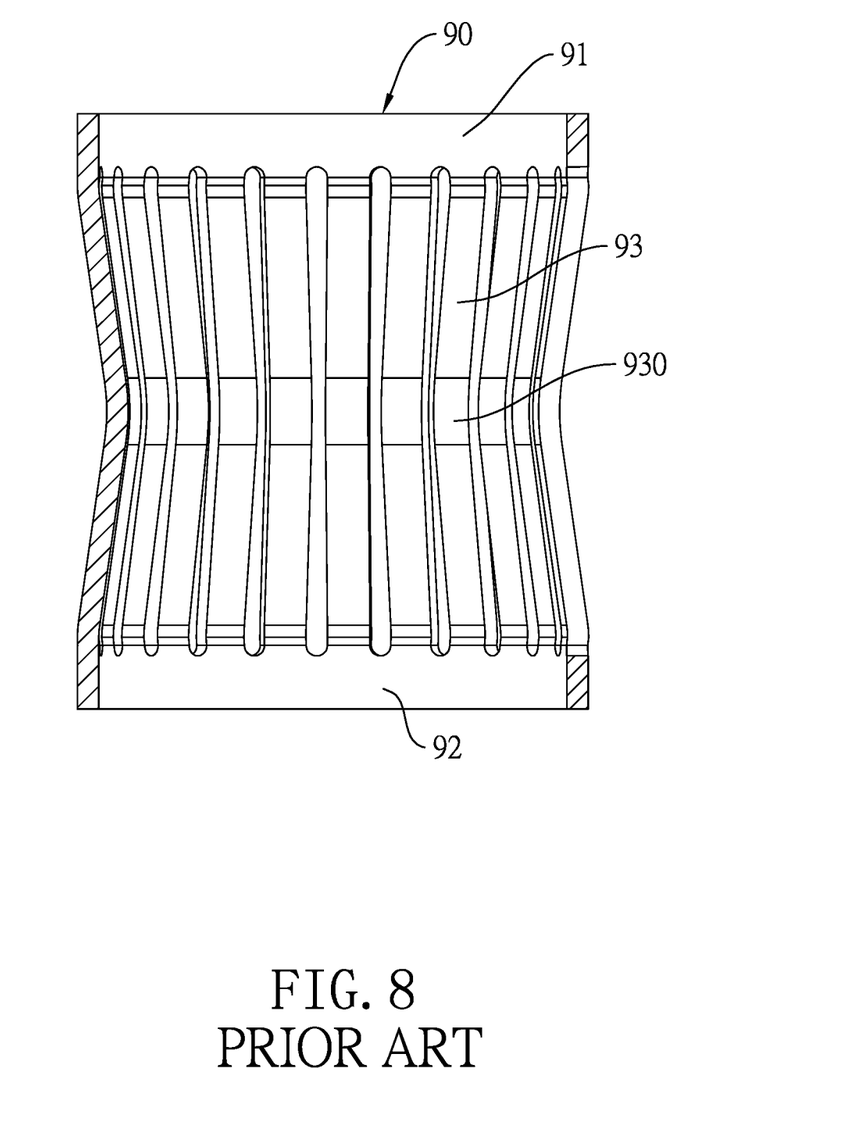
FIG. 8 is a sectional view of the conventional elastic contact element.

Then please refer to FIG. 7 and FIG. 8. The elastic contact element 90 comprises an upper ring 91, a lower ring 92, and multiple elastic flat bodies 93. Two ends of each one of the elastic flat bodies 93 are respectively connected to the upper ring 91 and the lower ring 92. The upper ring 91 and the lower ring 92 are C-shaped. Each one of the elastic flat bodies 93 forms a contact portion 930 protruding toward a center axis, which forms multiple connecting points with the inserted male probe thereby electrically connected firmly. The overall shape of the elastic contact element 90 is like a waist drum that has a narrowed middle portion. Because the shape of the elastic contact element 90 is similar to a crown, the elastic contact element 90 is also called a crown spring.

Figure 9:
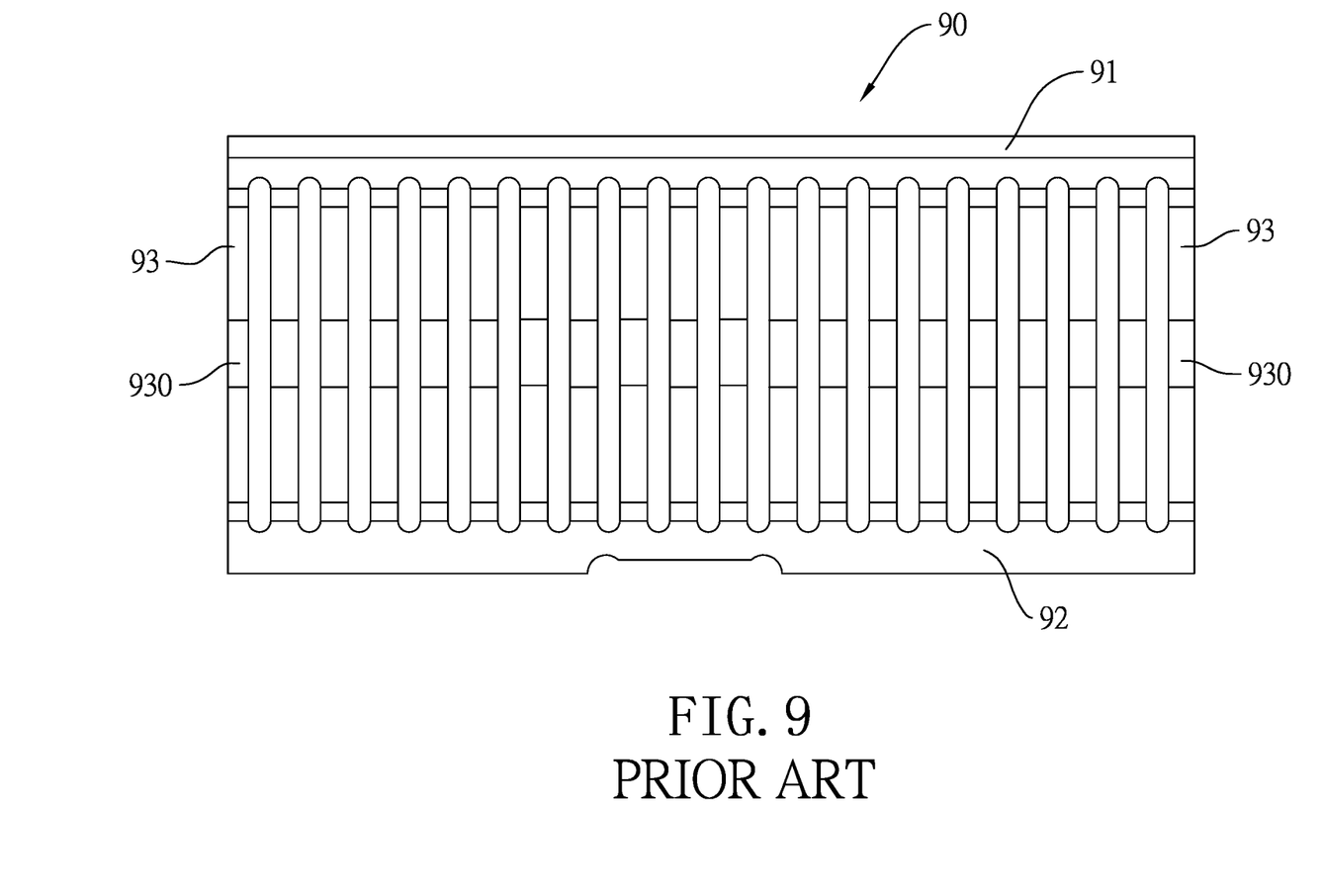
FIG. 9 is an expanded plan view of the conventional elastic contact element.

Please refer to FIG. 9, which shows the aforesaid conventional elastic contact element 90 expanded. As shown in the figure obviously, the contact portion 930 of each one of the elastic flat bodies 93 is located at the same height position, which means when the male probe is inserted into the elastic contact element 90, each one of the elastic flat bodies 93 is pushed outward and opened, thus the contact portion 930 of each one of the elastic flat bodies 93 contacts the male probe at the same height position. Because the male probe is contacted at the same height position, after being inserted and drawn out several times, the male probe must be worn at a specific portion, which decreases the electrical connection reliability and the power transmission efficiency.

Consequently, it is known that the male probe will be worn at a specific portion by the elastic contact element of the electrical connector after being inserted and drawn out several times. To overcome the shortcomings, the present invention provides an elastic contact element of an electrical connector to mitigate or obviate the aforementioned problems.

SUMMARY OF THE INVENTION

The main objective of the present invention is to provide an elastic contact element of an electrical connector that is capable of preventing an inserted male probe from being worn at a specific portion.

The elastic contact element of an electrical connector comprises an upper ring, a lower ring, and a plurality of elastic flat bodies. The elastic flat bodies are connected to and located between the upper ring and the lower ring and spaced apart from each other. Each one of the elastic flat bodies is a strip and forms a contact portion. The contact portion protrudes toward a center axis extending between the upper ring and the lower ring. The elastic flat bodies are divided into multiple groups, the contact portions in different ones of the groups of the elastic flat bodies are located at different height positions.

Because the elastic contact element of an electrical connector divides the elastic flat bodies into several groups according to the contact portions formed at different height positions, when the corresponding male probe is inserted, the contact portions of the elastic flat bodies contact the male probe at various height positions, which prevents the male probe from being worn at a specific portion after inserted and drawn out several times.

Other objectives, advantages and novel features of the invention will become more apparent from the following detailed description when taken in conjunction with the accompanying drawings.

DETAILED DESCRIPTION OF THE PREFERRED EMBODIMENTS

An elastic contact element of an electrical connector is provided. Please refer to FIG. 1 and FIG. 2. In a preferred embodiment, the elastic contact element comprises an upper ring 10, a lower ring 20, and a plurality of elastic flat bodies 31/32 (i.e. the first elastic flat bodies 31 and the second elastic flat bodies 32) connected to and located between the upper ring 10 and the lower ring 20.

Figure 1:
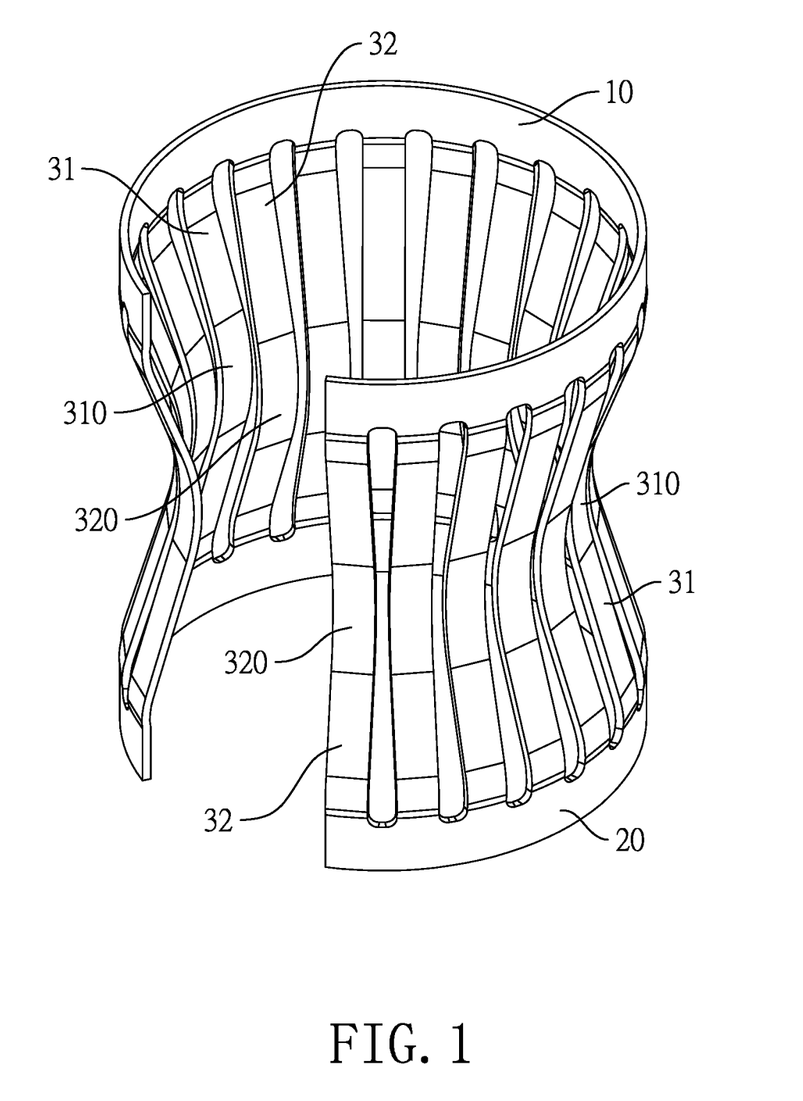
FIG. 1 is a perspective view of an elastic contact element in accordance with a first preferred embodiment of the present invention.
Figure 2:
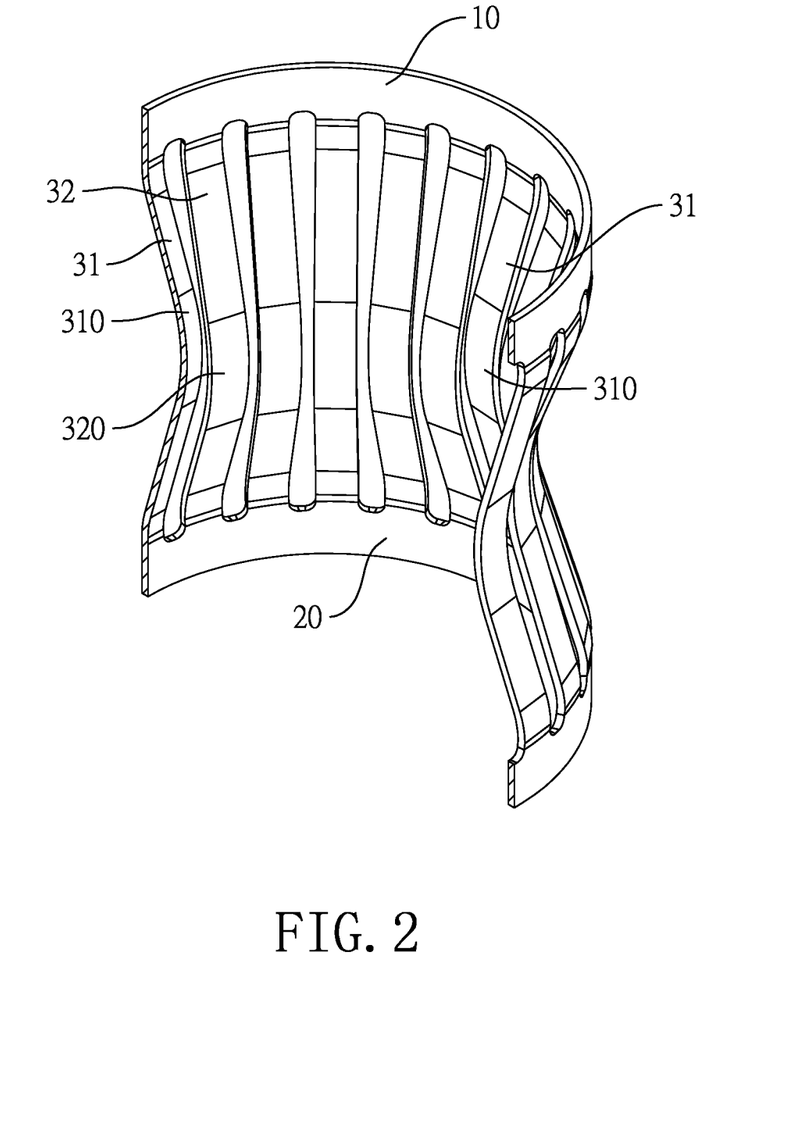
FIG. 2 is a sectional view of the elastic contact element in FIG. 1.

In this embodiment, the upper ring 10 comprises an opening and the lower ring 20 comprises another opening. Therefore, from the top view, the upper ring 10 and the lower ring 20 are C-shaped and the opening of the upper ring 10 and the opening of the lower ring 20 are aligned to each other. An interval is formed between the upper ring 10 and the lower ring 20. The elastic flat bodies 31/32 are spaced from each other between the upper ring 10 and the lower ring 20. The actual length of each one of the elastic flat bodies 31/32 is larger than a distance between the upper ring 10 and the lower ring 20, which means each one of the elastic flat bodies 31/32 is bent or curved.

Each one of the first elastic flat bodies 31 includes a first straight section, a second straight section, and a first connecting section. The first straight section is connected to the upper ring and obliquely extends toward a center axis. The second straight section is connected to the lower ring and obliquely extends toward the center axis. The first connecting section is located between the first straight section and the second straight section and connected to the first straight section and the second straight section. Each one of the second elastic flat bodies 32 includes a third straight section, a fourth straight section, and a second connecting section. The third straight section is connected to the upper ring and obliquely extends toward the center axis. The fourth straight section is connected to the lower ring and obliquely extends toward the center axis. The second connecting section is located between the third straight section and the fourth straight section and connected to the third straight section and the fourth straight section. A length of the third straight section is unequal to a length of the first straight section.

Precisely, each one of the elastic flat bodies 31/32 forms a contact portion and the contact portion protrudes toward an axis direction extending between the upper ring 10 and the lower ring 20. The first connecting section of the first elastic flat bodies 31 forms the contact portion which is defined as a first contact portion. The second connecting section of the second elastic flat bodies 32 forms the contact portion which is defined as a second contact portion. In this embodiment, each one of the elastic flat bodies 31/32 is divided into multiple groups according to different height positions of the contact portions. It can be realized as: because the elastic flat bodies 31/32 have the contact portions at different height positions, when a male probe is inserted into the elastic contact element of the present invention, the contact portions of the elastic flat bodies 31/32 may contact the male probe at different positions, which prevents the male probe from being worn at the same position after inserted and drawn out several times.

As mentioned above, the elastic flat bodies 31/32 of the present invention form the contact portions at different height positions, which means: the elastic flat bodies 31/32 form the contact portions at two or more height positions. In the following embodiment, each one of the elastic flat bodies 31/32 forms the contact portions at two different height positions. It must be emphasized that: the aforesaid elastic flat bodies 31/32 forming the contact portions at different height positions are described as an example and do not limit each one of the elastic flat bodies 31/32 to form the contact portions at the illustrated specific height positions.

Figure 3:
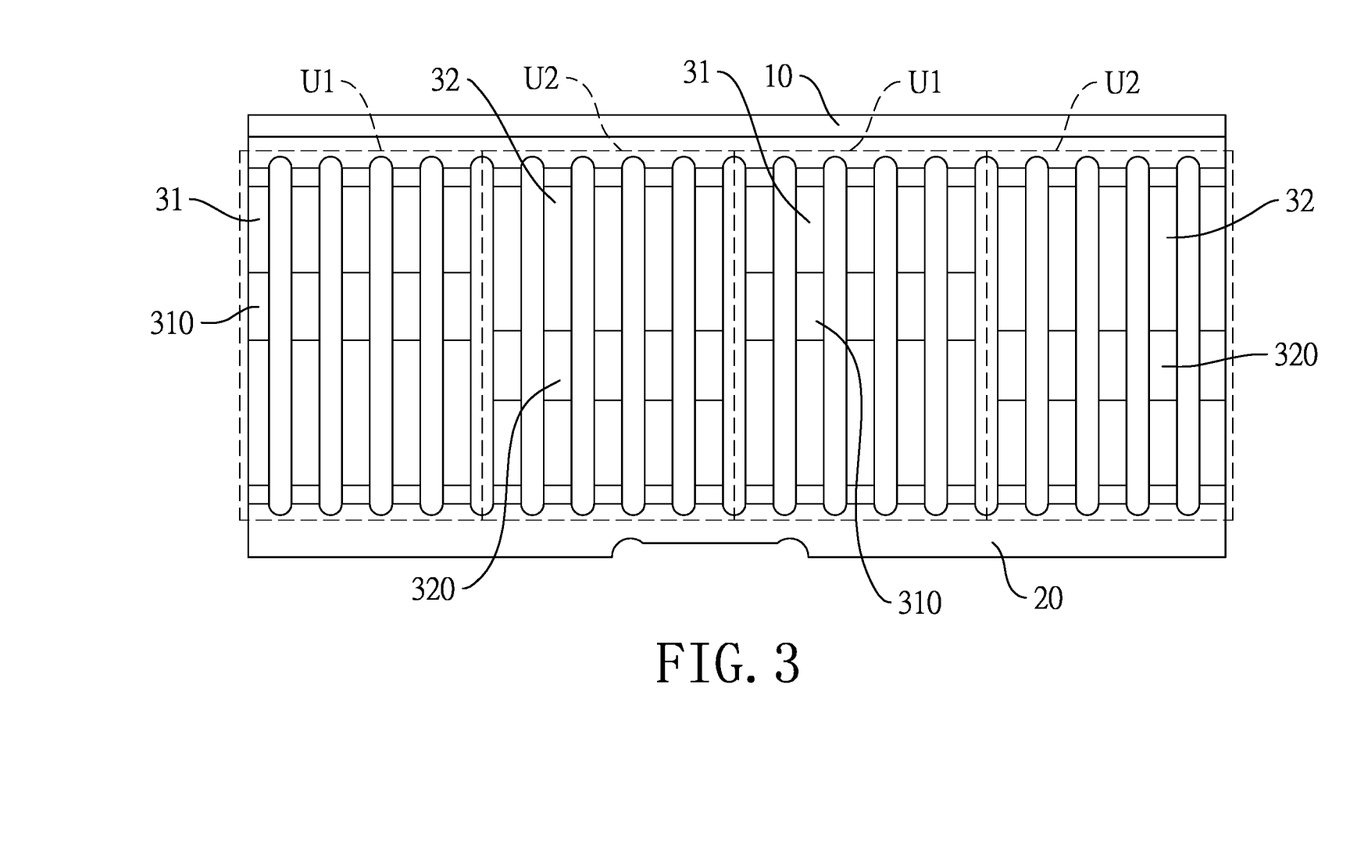
FIG. 3 is an expanded plan view of the elastic contact element in FIG. 1.

Please refer to FIG. 3, which shows an expanded plan view of the elastic contact element in accordance with the present invention. As shown in the expanded plan view, the elastic contact element of the present invention can be made by stamping, cutting, and bending from a strip material. The details are shown in FIG. 3 clearly: the elastic flat bodies 31/32 are located between the upper ring 10 and the lower ring 20 and spaced from each other, each one of the elastic flat bodies 31 forms a first contact portion 310 at a first height position, each one of the elastic flat bodies 32 forms a second contact portion 320 at a second height position, and the first contact portion 310 is higher than the second contact portion 320 in height position.

In the previous embodiment, a first unit U1 comprises multiple said elastic flat bodies 31, which have the first contact portions 310 formed at the first height position; a second unit U2 comprises multiple said elastic flat bodies 32, which have the second contact portion 320 formed at the second height position. The first units U1 and the second units U2 are staggered with each other, so the first contact portion 310 of each one of the elastic flat bodies 31 in each one of the first units U1 and the second contact portion 320 of each one of the elastic flat bodies 32 in each one of the second units U2 are staggered with each other in height position and form a wavy-shape.

Moreover, because the contact portion of each one of the elastic flat bodies is formed by bending, in some viewpoints according to the drawings, portions of the first contact portions 310 of the elastic flat body 31 and portions of the second contact portion 320 of the elastic flat body 32 may be overlapped in height position. However, actually, both the first contact portions 310 and the second contact portions 320 protrude toward a center axis extending between the upper ring 10 and the lower ring 20 and tip points of the first contact portions 310 and the second contact portions 320 contact the male probe, so contact points of the first contact portions 310 of the elastic flat bodies 31 and contact points of the second contact portions 320 of the elastic flat bodies 32 are staggered to each other.

As mentioned above, unlike conventional elastic contact element, which has the elastic flat body forming the contact portions via protruding toward an center axis between the upper ring and the lower ring and thus is waist-drum-shaped, the elastic contact element according to the present invention divides the elastic flat bodies 31/32 into several groups according to the first contact portion 310 and the second contact portion 320 formed at different height positions. Therefore, the elastic contact element according to the present invention does not narrow at the same height position, which means that the first contact portion 310 and the second contact portion 320 of the elastic flat bodies 31/32 may not concentrate on one single height position to contact the male probe.

Figure 4:
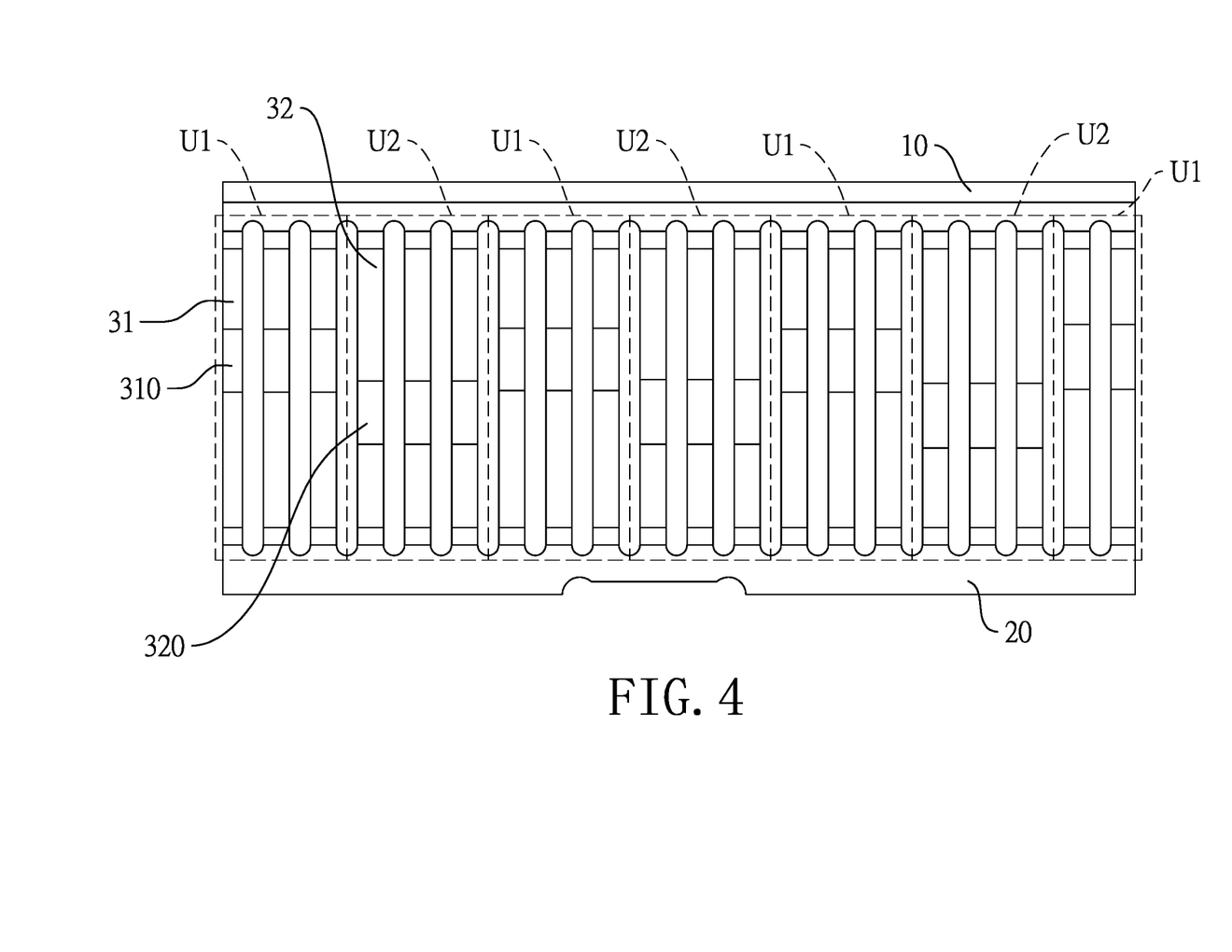
FIG. 4 is an expanded plan view of the elastic contact element in accordance with a second embodiment of the present invention.

As mentioned above, the elastic contact element according to the present invention lets the elastic flat bodies 31/32, which are located between the upper ring 10 and the lower ring 20, form the contact portions at different height positions. In an embodiment as shown in FIG. 3, the first unit U1 consists of five of the elastic flat bodies 31, and the second unit U2 consists of five of the elastic flat bodies 32. Then, as shown in FIG. 4, the first unit U1 consists of three of the elastic flat bodies 31, and the second unit U2 consists of three of the elastic flat bodies 32. If the number of the elastic flat bodies in one unit is decreased, in the circumstance that the total number of the elastic flat body is the same, the number of the units is increased.

Figure 5:
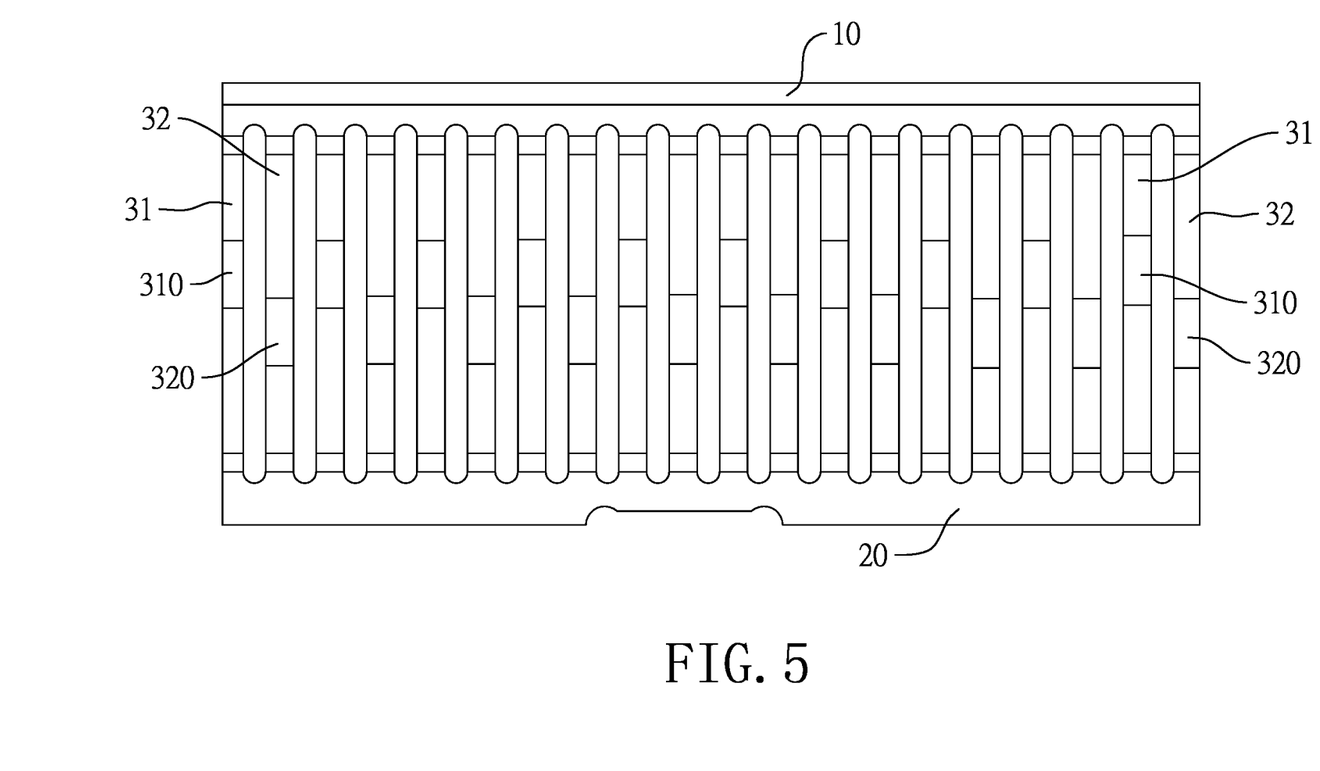
FIG. 5 is an expanded plan view of the elastic contact element in accordance with a third embodiment of the present invention.

Please refer to FIG. 5. The elastic flat bodies 31/32 between the upper ring 10 and the lower ring 20 are divided into several groups according to the first contact portion 310 and the second contact portion 320 that are formed at different height positions. But, unlike the previous embodiments, in which one unit consists of multiple elastic flat bodies 31/32, in the elastic contact element according to this embodiment, the elastic flat bodies 31 having the first contact portions 310 and the elastic flat bodies 32 having the second contact portions 320 are staggered with each other one by one. Therefore, the first contact portion 310 and the second contact portion 320, which are formed at different height positions, are also staggered with each other.

As mentioned above, the elastic contact element according to the present invention divides the elastic flat bodies between the upper ring and the lower ring into several groups according to the contact portions formed at different height positions. With the contact portions of the elastic flat bodied staggered with each other in height position, the inserted male probe is prevented from being worn at a specific portion after being inserted and drawn out several times. Furthermore, it also makes the elastic flat bodies of the elastic contact element contact the male probe as much as possible, which ensures the power transmission efficiency.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. An elastic contact element of an electrical connector comprising:
    an upper ring;
    a lower ring;
    a plurality of elastic flat bodies connected to and located between the upper ring and the lower ring, spaced apart from each other, and each one of the elastic flat bodies being a strip and forming:
        a contact portion protruding toward a center axis extending between the upper ring and the lower ring;
    wherein the elastic flat bodies are divided into multiple groups, the contact portions in different ones of the groups of the elastic flat bodies are located at different height positions;
    wherein one of the groups has multiple first elastic flat bodies, and each one of the first elastic flat bodies includes:
        a first straight section connected to the upper ring and obliquely extending toward the center axis;
        a second straight section connected to the lower ring and obliquely extending toward the center axis;
        a first connecting section located between the first straight section and the second straight section, connected to the first straight section and the second straight section, and forming the contact portion, which is defined as a first contact portion; and
    wherein one of the groups has multiple second elastic flat bodies, and each one of the second elastic flat bodies includes:
        a third straight section connected to the upper ring and obliquely extending toward the center axis; a length of the third straight section being unequal to a length of the first straight section;
        a fourth straight section connected to the lower ring and obliquely extending toward the center axis;
        a second connecting section located between the third straight section and the fourth straight section, connected to the third straight section and the fourth straight section, and forming the contact portion, which is defined as a second contact portion;
    wherein multiple of the first elastic flat bodies are assembled as a plurality of first units, multiple of the elastic flat bodies are assembled as a plurality of second units, and the first units and the second units are staggered with each other and thus the first contact portions and the second contact portions are staggered with each other in height position in a wavy shape.

2. The elastic contact element of an electrical connector as claimed in claim 1, wherein the elastic flat bodies form the contact portions at more than two different height positions.

3. The elastic contact element of an electrical connector as claimed in claim 2, wherein each one of the elastic flat bodies in one of the groups forms the first contact portion at a first height position and each one of the elastic flat bodies in another one of the groups forms the second contact portion at a second height position, and the first contact portion is higher than the second contact portion in height position.

4. The elastic contact element of an electrical connector as claimed in claim 1, wherein:
    each one of the first units includes five of the elastic flat bodies that have the first contact portions; and
    each one of the second units includes five of the elastic flat bodies that have the second contact portions.

5. The elastic contact element of an electrical connector as claimed in claim 1, wherein:
    the upper ring is C-shaped and has an opening;
    the lower ring is C-shaped and has an opening; and
    the opening of the upper ring and the opening of the lower ring are aligned to each other.

6. The elastic contact element of an electrical connector as claimed in claim 4, wherein:
    the upper ring is C-shaped and has an opening;
    the lower ring is C-shaped and has an opening; and
    the opening of the upper ring and the opening of the lower ring are aligned to each other.

* * * * *